United States Patent [19]

Maule

[11] 4,048,468
[45] Sept. 13, 1977

[54] D.C. ARC WELDER WITH SOLID STATE COMPONENTS

[76] Inventor: Clemente Maule, Via C. Battisti, 6, Vicenza, Italy

[21] Appl. No.: 624,639

[22] Filed: Oct. 21, 1975

[30] Foreign Application Priority Data

Oct. 25, 1974  Italy .................................. 41703/74

[51] Int. Cl.² .............................................. B23K 9/10
[52] U.S. Cl. ............................. 219/135; 219/131 WR
[58] Field of Search ........... 219/135, 131 R, 131 WR, 219/131 F; 321/4, 18

[56] References Cited

U.S. PATENT DOCUMENTS

| 3,528,100 | 9/1970 | Budy | 219/131 R |
|---|---|---|---|
| 3,728,516 | 4/1973 | Daspit | 219/135 |
| 3,775,662 | 11/1973 | Compoly et al. | 321/4 |
| 3,894,210 | 7/1975 | Smith et al. | 219/131 R |
| 3,904,846 | 9/1975 | Risberg | 219/135 |

FOREIGN PATENT DOCUMENTS 413,158  12/1966  Germany ......................... 219/131 R

OTHER PUBLICATIONS

O. N. Bratkova et al., "A High Frequency Welding Current Source with the Penetrating Power of the Arc Automatically Regulated", *Avt. Svarka*, vol. 24, No. 6, June 1971, pp. 56–58.

*Primary Examiner*—J. V. Truhe
*Assistant Examiner*—Clifford C. Shaw
*Attorney, Agent, or Firm*—Guido Modiano; Albert Josif

[57] ABSTRACT

A D.C. arc welder with solid state components which is provided with means for converting A.C. to D.C. and with controlled diodes serially connected in the D.C. line between the converting bridge and a transformer providing electric insulation between the D.C. line and the terminals of a welding head. A further controlled diode is also connected to the D.C. line downstream of the control diodes and in parallel with the transformer and in series with a capacitor. Between the transformer and the welding head a rectifying assembly is arranged. The serially connected controlled diodes are simultaneously triggered by a pulse amplifier and transformer. A further pulse amplifier and a further pulse transformer subsequently trigger the further controlled diode, whereby the serially connected controlled diodes are turned off. The pulse amplifiers and transformers are alternately driven by a square wave generating assembly whose period depends on a magnitude proportional to the voltage and current levels at the terminals of the welding head.

3 Claims; 4 Drawing Figures

D.C. ARC WELDER WITH SOLID STATE COMPONENTS

BACKGROUND OF THE INVENTION

This invention relates to an electric direct current arc welder with solid state components, of particularly low weight and overall size.

At present the direct current for arc welders is produced by a rotating generator in the form of a dynamo driven by an electric motor or an explosion engine, or by a current rectifier assembly provided with selenium plates or by silicon diode rectifiers. The current delivered is adjusted in accordance with the voltage and intensity characteristics appropriate to the welding work and the electrode diameter, and is adjusted by magnetic feed back in the case of rotating generators, and in the case of static generators by varying the magnetic dispersion or by inductive drops, by controlled rectifier bridges or by connecting an electronic switch in series with the arc.

Rotating generators or converters present disadvantages due to their high noise level and the necessary maintenance.

Rectifier units or static converters, while obviating the aforesaid disadvantages, are of large size and weight. This is because whatever adjustment technique is used for the arc current, the size, cost and weight of said converters are governed by the presence of a transformer fed at mains frequency, the purpose of which is both to obtain the voltage required by the process at the utilization terminals, and to isolate these latter from the mains supply.

The essential object of the present invention is to provide a direct current arc welder with solid state components, of particularly low weight and size.

A further object of the present invention is to provide a direct current arc welder with functional and structural characteristics of such nature that there do not exist power limitations in relation to its uses.

Another object of the present invention is to obtain high efficiency by reducing energy dissipation.

SUMMARY OF THE INVENTION

These and other objects, such as will become apparent hereinafter, are achieved by a D.C. arc welder with solid state components, wherein an electric arc is struck at the output terminals thereof, the welder comprising: a frequency converting means connected to the supply mains and providing an output voltage wave having a frequency which is appreciably higher than the frequency of the voltage wave of said supply mains; a transformer suitable to provide electric insulation between said first frequency converting means and said output terminals and furthermore adapted to provide an alternating low tension signal having a value appropriate for the characteristics of the welding process; means suitable for converting said alternating low tension signal into a unidirectional low tension signal; and means suitable for driving said frequency converting means according to the tension and current levels at said output terminals, wherein said frequency converting means is substantially a rectifying bridge and comprises controlled diodes serially connected in the D.C. line between said rectifying bridge and said transformer, there being also connected to said D.C. line, downstream of said controlled diodes and substantially in parallel with said transformer, a further controlled diode, and in that said means for driving said frequency converting means comprise pulse amplifiers and transformers suitable for triggering simultaneously said controlled diodes serially connected in said D.C. line and to subsequently trigger said further controlled diode, the triggering whereof is effective to turn off said serially connected controlled diodes, said pulse amplifiers and transformers being driven by a square wave generating assembly the period whereof depends essentially on a magnitude which is proportional to the voltage and current levels at said output terminals.

BRIEF DESCRIPTION OF THE DRAWINGS

The invention, for what concerns one of its preferred though not exclusive embodiments, will be next described in more detail with reference to the accompanying drawings, being exemplary and not limitative, wherein.

DESCRIPTION OF A PREFERRED EMBODIMENT

Figure 1:
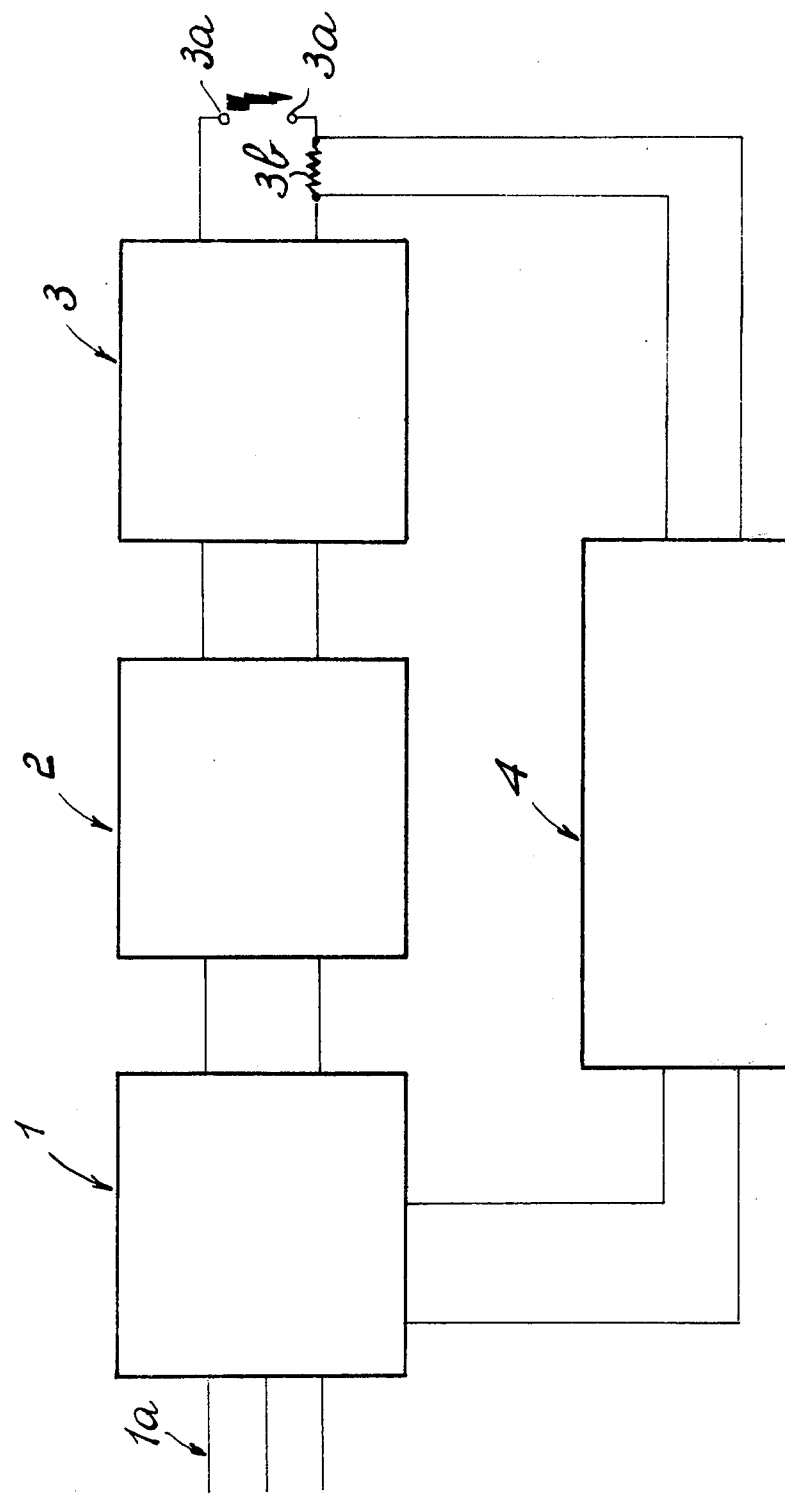
FIG. 1 is a block diagram evidencing the operational features of the invention.

With reference to the above FIGS. a block 1 representing the frequency converting means and including electronic switching means is connected to the supply mains 1a; in cascade arrangement with respect thereto, a block 2 is provided which ensures electric insulation between the components located upstream and downstream thereof, and moreover supplying at the output an alternating voltage having a value appropriate for the characteristics of the welding process; the last block 3, also cascade connected with respect to the block 2, includes a voltage rectifying assembly. Substantially serially connected with the output terminals 3a whereacross the arc is struck, a resistor 3b is provided to the terminals whereof there is connected the block 4 which comprises means for controlling the electronic switching means of C.S. block 1.

Figure 2:
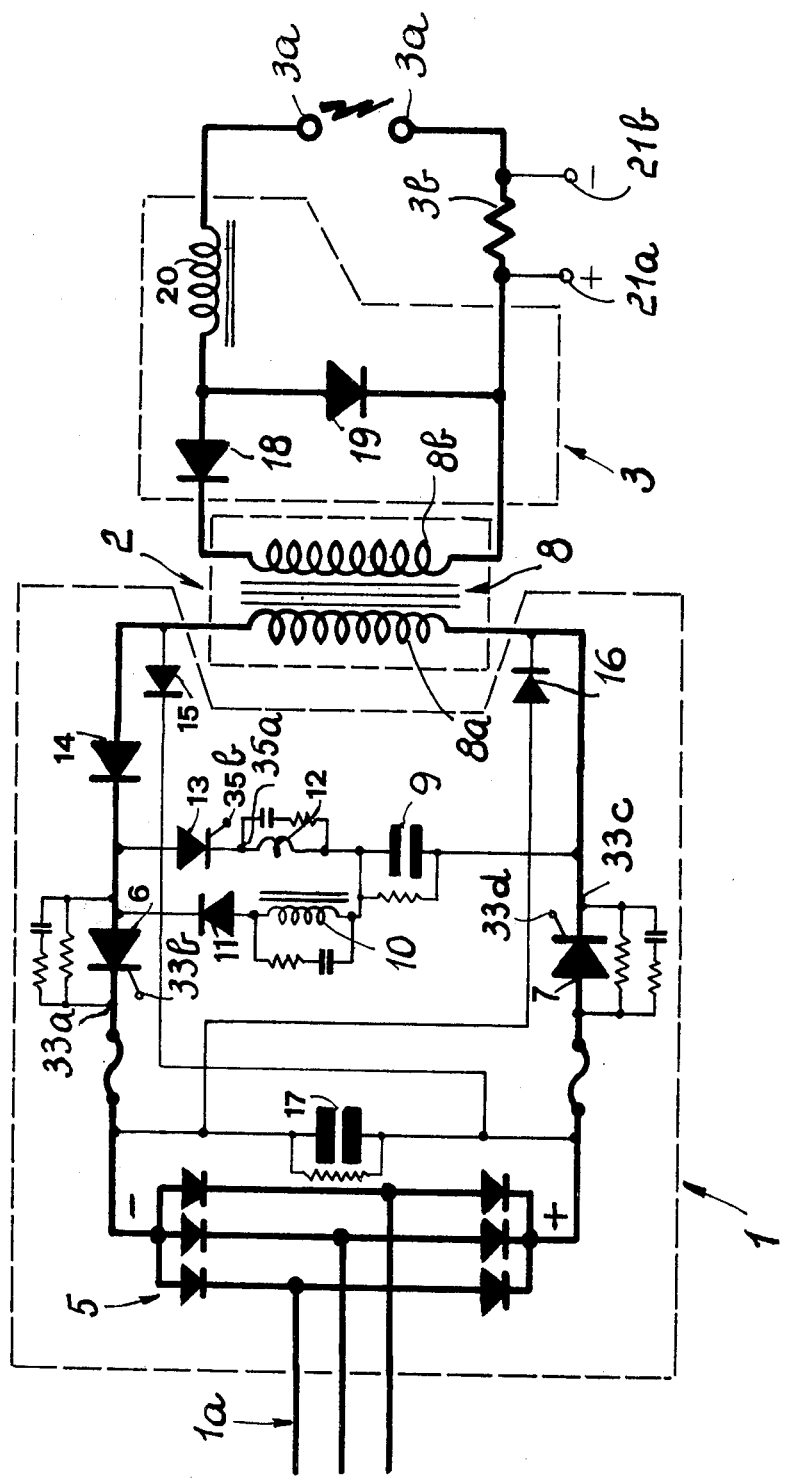
FIG. 2 is an electric diagram of one embodiment of the circuitry making up the power portion of the invention.

Within the block 1 means for providing a direct current are arranged comprising, a three-phase rectifying bridge 5 downstream whereof two controlled diodes 6 and 7 are connected in series in a first electric D.C. path between the three-phase rectifying bridge 5 and the primary winding 8a of an insulating and matching transformer 8 which is included in the block 2. As visible from FIG. 2 one of the controlled diodes is arranged upstream and the other downstream of the primary 8a. In parallel to the primary 8a, between the primary and each of the controlled diodes 6 and 7, there are arranged, in series between each other, a condenser or capacitor 9, an inductance 10a and diode 11; furthermore, between on terminal of the capacitor 9 and the D.C. line, in parallel to the inductance 10 and diode 11, there is arranged a further inductance 12 and a further controlled diode 13. Also in the D.C. line, a diode 14 is series connected in order to prevent oscillatory phenomena from taking place. There are provided, as can be more clearly seen in FIG. 2, further diodes 15 and 16 which are connected to a capacitor 17 arranged in parallel to the rectifying bridge 5. The diodes 15 and 16 are each connected to one end of the primary 8a.

To the secondary 8b of the transformer 8, there is connected a half-wave rectifying device comprising the diodes 18 and 19, and including moreover an inductance 20 serially connected in a second electric path to the output terminals 3a This arrangement provides a unidirectional current signal in said second electricpath. electric path.

Figure 3:
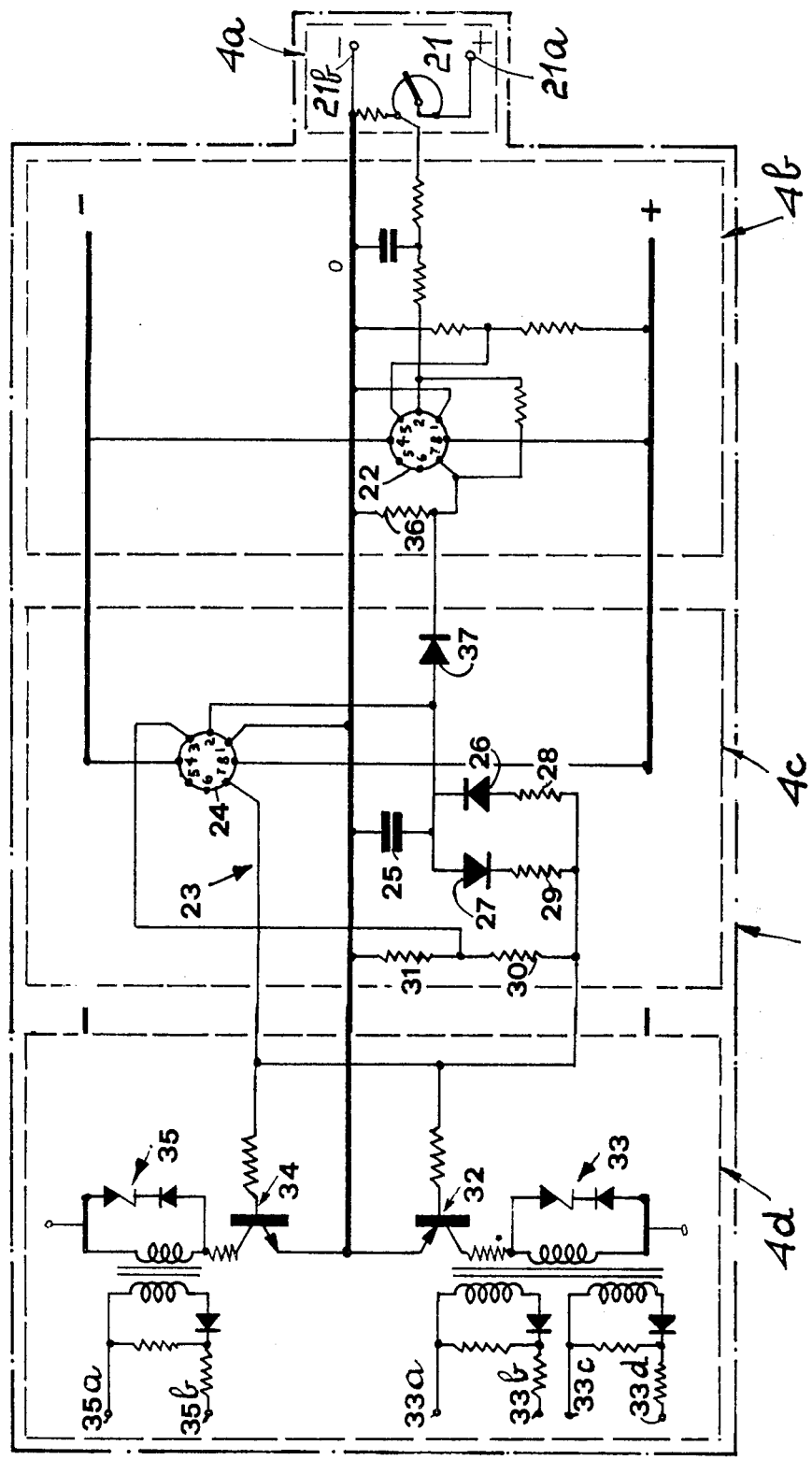
FIG. 3 is an electric diagram or wiring diagram of the embodiment of the circuitry making up the control portion of the power portion shown in FIG. 2.
Figure 4:
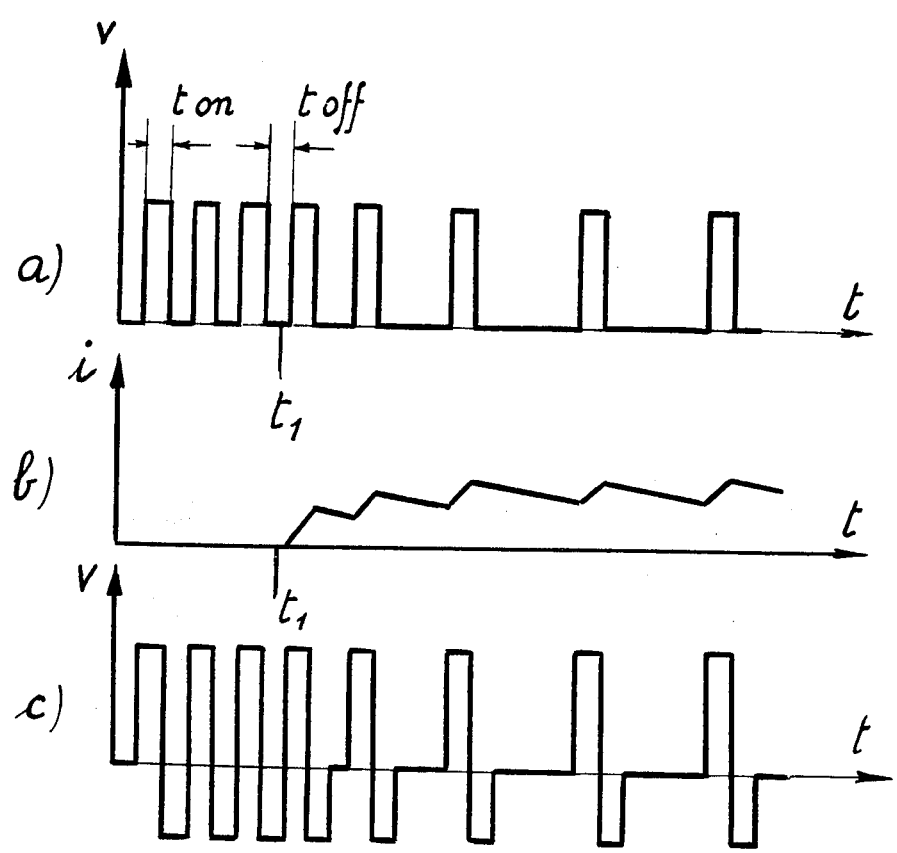
FIG. 4 represents respectively:
a. the voltage downstream of the frequency converting means;
b. the arc current;
c. the voltage on the coupling transformer.

The control block 4 may be considered as comprising four basic blocks 4a, 4b 4c, and 4d, as illustrated in FIG. 3.

The block 4a comprises essentially a potentiometer 21, the terminals 21a and 21b whereof are connected to the resistor 3b terminals.

The block 4b comprises essentially an amplifier 22 which is connected to passive elements interconnected such as to make up circuits well known per se.

The block 4c comprises substantially a square wave generator 23, formed by an operational amplifier 24, a condenser or capacitor 25, two diodes 26 and 27 serially connected to two resistors, respectively 28 and 29, and by two other resistors 30 and 31.

The block 4d comprises essentially a first amplifier 32 and a first pulse transformer 33 suitable to trigger simultaneously the controlled diodes 6 and 7, and a second amplifier 34 and second pulse transformer 35 suitable to trigger the further controlled diode 13.

The resistor 36, which is connected to the block 4c via the diode 37, is of primary importance, as evidenced hereinafter, in the operation of the whole system.

The pulse transformers 33 and 35 are connected to the controlled diodes 6, 7 and 13, as is apparent from the numerals referencing the respective terminals.

The operation of the instant arc welder, as already deducible from the structural and assembling explanations provided hereinabove, may be synthethized as follows.

The alternating square wave generator 23 generates a negative-going half-wave tension signal which, through the amplifier 22 and pulse transformer 33, supplies the pulses required to simultaneously trigger the controlled diodes 6 and 7 into the conductive state.

The duration of the negative-going half-wave tension signal is constant throughout the different operation conditions, and is in practice established by the combination of the capacitor 25 and resistor 29. On termination of the negative-going half-wave, the generator 23 generates a positive-going half-wave which, through the amplifier 34 and pulse transformer 35, supplies the pulse required to trigger the controlled diode 13 into the conductive state.

The duration of the positive-going half-wave is not constant, inasmuchas, besides being characterized by the combination of the capacitor 25 with the resistor 28, it is also dependent on the voltage or tension apparent at the resistor 36 terminals, which voltage or tension is in turn conditioned by the value of the tension signal appearing at the resistor 3b terminals. More precisely, an arc current increase involves a corresponding increase in the signal appearing at the resistor 3b terminals, and thus a reduction in the voltage at the resistor 3b terminals, thereby the duration of the positive-going half-wave is also increased. Thus, a square wave having a period depending on the voltage and current at the output terminals 3a is generated by the square wave generator. On termination of the positive-going half-wave, a new negative-going half-wave is started, and the cycle repeated.

At the start of the negative-going wave, the first and second controlled diodes 6 and 7 are rendered conductive. The condition thereof allows the current to pass through the transformer 8, and causes the capacitor 9 to be charged through the inductance 10 and diode 11; the condenser 9, by reason of the particular values selected for the parameters of the charging circuit, and due to oscillatory phenomena, exhibits a voltage at the output of the rectifying bridge 5 which is higher than the supply voltage caused by the presence of an inductance, thereby when the negative-going half-wave terminates and the positive-going one starts, thus supplying the further controlled diode 13 with the pulse for the triggering thereof, an inverted voltage appears at the controlled diodes 6 and 7, which is effective to turn off the serially connected diodes 6 and 7 into the nonconductive state. The magnetic energy previously stored in the transformer 8 is discharged on the capacitor 17 through the diodes 15 and 16, thus permitting such as an energy to be recovered.

The time lapse between the instant the controlled diodes 6 and 7 are triggered and that in which the controlled diode 13 is triggered, represents the duration of the voltage step supplied by the transformer 8. It should be noted that said step is rectangular theoretically only, since owing to the capacitor 9 discharge, there would occur a peak at the instant the controlled diodes 6 and 7 are turned off.

The controlled diode 13 turns off during the capacitor 9 discharge, thereby the system is made ready for the retriggering of the controlled diodes 6 and 7. Obviously, the circuit parameters shall have to be suitably correlated with one another. Thus, for example, the duration of the positive-going half-wave supplied by the square wave generator 23 must be longer than the time lapse during which the further controlled diode 13 is held conductive.

From the foregoing, it will be apparent that the invention fully achieves the objects intended. Thus, owing to the particular components and circuitry used, the invention becomes economical to manufacture and reliable in operation, such that the instant D.C. arc welder may be designed for practically any power.

The invention is susceptible to numerous modifications and variations thereof, all of which are well within the scope of the inventive concept.

Furthermore, all the constructional details may be substituted with other technically equivalent elements.

In practicing the invention, the materials employed and the dimensions selected may be any ones, to suit different applications.

I claim:

1. A D.C. arc welder with solid state components, having two output terminals and means for generating an arc at said output terminals, said means including means for providing a direct current, a first electric path downstream of said direct current providing means, a transformer having a primary in series with said first electric path and a secondary connected to said output terminals through a second electric path, electronic switching means for causing a pulse train to be generated in said first electric path and in said primary, means for controlling said electronic switching means according to the tension and current conditions at said output terminals, and means for converting the pulse tension signal induced at said secondary by said pulse train in said primary into an unidirectional current signal, wherein said electronic switching means includes a first and a second controlled diode serially connected in said first electric path, one of said controlled diodes being connected upstream and the other downstream of said primary, a further controlled diode and a capacitor connected in series with respect to one another and in parallel with respect to said primary between said primary and said first and second controlled diodes, respectively, an inductance in series with said capacitor and in parallel with said further controlled diode, and wherein said means for controlling said electronic switching means includes a square wave generator providing a half-wave tension signal for simultaneously triggering said first and second controlled diode to become conductive and a half-wave tension signal for triggering said further controlled diode to become conductive, the triggering of said further controlled diode causing said first and said second controlled diodes to be turned off into the non-conductive state, said square wave generator generating a square wave having a period depending on the voltage and current at said output terminals.

2. An arc welder as claimed in claim 1, wherein said square wave generator comprises means for generating a negative half-wave tension signal of constant duration for simultaneously triggering said first and second controlled diodes into the conductive state, and a positive half-wave tension signal of a duration depending on the intensity of said arc for triggering said further controlled diode into the conductive state.

3. An arc welder as claimed in claim 1, further comprising means for recovering the energy stored in said transformer at each tension and current pulse, said means including an auxiliary capacitor arranged in parallel to said direct current providing means, and two diodes each arranged between one end of said primary and a respective end of said auxiliary capacitor.

* * * * *